S. R. STANTON.
Weather-Strips.
No. 152,700. Patented June 30, 1874.
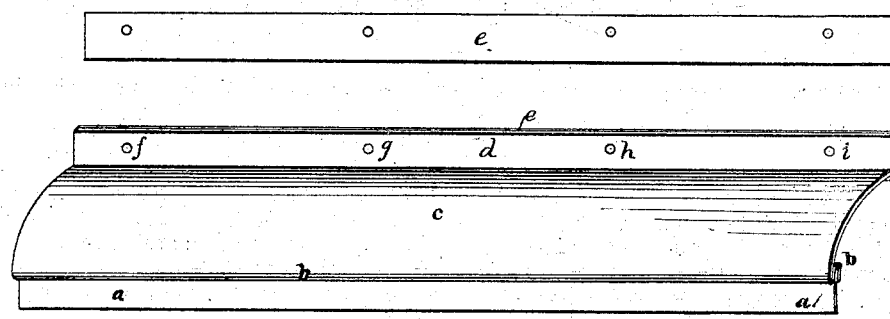
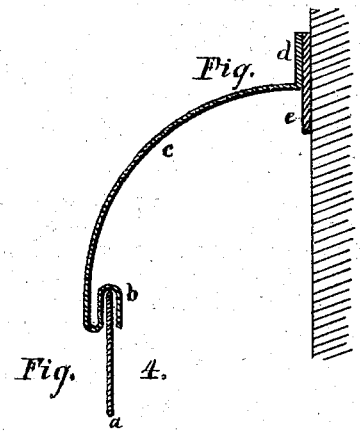
Witnesses:
L. W. Stanton
Charles Cole
Inventor:
Spencer R. Stanton

UNITED STATES PATENT OFFICE.

SPENCER R. STANTON, OF OXFORD, MICHIGAN.

IMPROVEMENT IN WEATHER-STRIPS.

Specification forming part of Letters Patent No. 152,700, dated June 30, 1874; application filed March 20, 1874.

*To all whom it may concern:*

Be it known that I, SPENCER R. STANTON, of Oxford, county of Oakland and State of Michigan, have invented a new and Improved Weather-Strip, of which the following is a specification:

The object of my invention is to form a protection from the driving in of wind, rain, sleet, hail, &c., beneath the doors of buildings, and to close effectually the space between the bottom of the door and the threshold by a combination of zinc plate or other metal, in connection with a strip of rubber or other flexible material, as shown by $a$ and $c$, the rubber strip being secured to the curved metallic piece by being clamped between folds, into which the said curved metallic piece is formed at its lower edge, the part curving over the upper edge of the rubber strip serving to hold it firmly and evenly against the floor throughout its entire length; and, further, by interposing a strip of packing between the metal and the door at the point of attachment, thus forming a practically air-tight joint, Figure 2 of the accompanying drawing, together with the rubber packing $e$, Fig. 1 of the same. Fig. 3 represents a sectional or end view of the device, illustrating the peculiar manner in which the rubber or other flexible strip is secured to the metal plate $c$ at $b$, Fig. 2, by compressing the folded part $b$ upon it.

The metal plate $c$ is curved or arched out from the face of the door to which it is attached, as shown in Fig. 2. $f$, $g$, $h$, and $i$ represent the point at which the metal plate is secured to the door, inclosing between it and the door the rubber packing $e$, as shown at $e$, Fig. 2. Fig. 3 represents at $b$ the bending of the metal plate in such a manner as to receive the rubber strip $a$, and of securing the same to the rubber or other flexible strip by compressing it upon the strip.

I claim as my invention—

1. The metallic weather-strip, substantially as shown and described, having its lower edge bent into folds, which are compressed upon a rubber strip.

2. A weather-strip consisting of the curved metallic piece $c$, having the fold $b$, and the rubber strip $a$, and packing $e$, substantially as shown and described.

SPENCER R. STANTON.

Witnesses:
L. W. STANTON,
CHARLES COLE.